United States Patent
Li et al.

(10) Patent No.: US 9,482,079 B2
(45) Date of Patent: Nov. 1, 2016

(54) DETERMINING ACID INJECTION TREATMENT PARAMETERS

(71) Applicant: Halliburton Energy Services, Inc., Houston, TX (US)

(72) Inventors: Weiming Li, Katy, TX (US); Aaron Christopher Kralovetz, Brazoria, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 565 days.

(21) Appl. No.: 14/015,933

(22) Filed: Aug. 30, 2013

(65) Prior Publication Data

US 2015/0066451 A1  Mar. 5, 2015

(51) Int. Cl.
| | |
|---|---|
| G06G 7/48 | (2006.01) |
| E21B 43/16 | (2006.01) |
| E21B 43/25 | (2006.01) |
| C09K 8/66 | (2006.01) |
| E21B 43/26 | (2006.01) |

(52) U.S. Cl.
CPC .............. *E21B 43/16* (2013.01); *C09K 8/66* (2013.01); *E21B 43/25* (2013.01); *E21B 43/26* (2013.01)

(58) Field of Classification Search
CPC ........ E21B 43/16; E21B 43/25; E21B 43/26; G01N 33/24; C04B 28/04; C09K 8/66; C09K 8/72
See application file for complete search history.

(56) References Cited

U.S. PATENT DOCUMENTS

| | | | |
|---|---|---|---|
| 6,196,318 B1 | 3/2001 | Gong et al. | |
| 6,207,620 B1* | 3/2001 | Gonzalez | C09K 8/72 |
| | | | 166/307 |
| 6,749,022 B1* | 6/2004 | Fredd | C09K 8/66 |
| | | | 166/250.1 |
| 2006/0184346 A1* | 8/2006 | Panga | E21B 43/16 |
| | | | 703/9 |
| 2008/0015832 A1* | 1/2008 | Tardy | E21B 43/25 |
| | | | 703/10 |
| 2011/0024115 A1* | 2/2011 | Brice | C04B 28/04 |
| | | | 166/294 |
| 2011/0284227 A1* | 11/2011 | Ayan | E21B 43/16 |
| | | | 166/307 |
| 2013/0014951 A1* | 1/2013 | Fitzpatrick | E21B 43/26 |
| | | | 166/305.1 |
| 2013/0168543 A1* | 7/2013 | Barron | G01N 33/24 |
| | | | 250/259 |
| 2013/0199787 A1* | 8/2013 | Dale | E21B 43/26 |
| | | | 166/302 |

OTHER PUBLICATIONS

Permadi, P., et al., "Permeability Prediction and Characteristics of Pore Structure and Geometry as Inferred From Core Data," SPE 125350, 2009 SPE/EAGE Reservoir Characterization and Simulation Conference, Abu Dhabi, UAE, Oct. 19-21, 2009, 12 pages.
Susilo, Agus, "Permeability Prediction Based on Capillary Model," SPE 141122-STU, SPE Annual Technical Conference and Exhibition, Florence, Italy, Sep. 19-22, 2010, 20 pages.

(Continued)

*Primary Examiner* — Kandasamy Thangavelu

(57) ABSTRACT

The present disclosure relates to determining acid injection treatment parameters. One example method includes identifying one or more characteristics of a rock structure; and determining one or more parameters of an acid injection treatment to produce a specified flow structure in the rock structure when the acid injection treatment is applied, the one or more parameters of the acid injection treatment determined based on the one or more characteristics of the rock structure and including at least one of an injection flow velocity or a characteristic of an acid to be used in the acid injection treatment.

20 Claims, 4 Drawing Sheets

(56) References Cited

OTHER PUBLICATIONS

Glasbergen, Gerard, et al., "The Optimum Injection Rate for Wormhole Propagation: Myth or Reality?" SPE 121464, 2009 SPE European Formation Damage Conference, Scheveningen, The Netherlands, May 27-29, 2009, 16 pages.

Talbot, M.S., et al., "Beyond the Damkohler Number: A New Interpretation of Carbonate Wormholing," SPE 113042, 2008 SPE Europec/EAGE Annual Conference and Exhibition, Rome, Italy, Jun. 9-12, 2008, 9 pages.

Panga, Mohan K.R., et al., "Two-Scale Continuum Model for Simulation of Wormholes in Carbonate Acidization," AlChE Journal, vol. 51, No. 12, Dec. 2005, pp. 3231-3248, 18 pages.

Gong, M., et al., "Quantitative Model of Wormholing Process in Carbonate Acidizing," SPE 52165, 1999 SPE Mid-Continent Operations Symposium, Oklahoma City, Oklahoma, Mar. 28-31, 1999, 11 pages.

Fredd, C.N., et al., "Optimum Conditions for Wormhole Formation in Carbonate Porous Media: Influence of Transport and Reaction," SPE 56995, SPE Journal 4 (3), Sep. 1999, pp. 196-205, 10 pages.

Mahmoud, M.A., et al., "Optimum Injection Rate of a New Chelate That Can Be Used to Stimulate Carbonate Reservoirs," SPE 133497, Dec. 2011 SPE Journal, pp. 968-980, 13 pages.

\* cited by examiner

DETERMINING ACID INJECTION TREATMENT PARAMETERS

BACKGROUND

This specification relates to determining acid injection treatment parameters for use in treating a rock structure.

In oil and gas exploration, acid treatments may be used to increase the conductivity of a rock formation by introducing conductive flow channels into the formation structure. Various parameters associated with the acid treatments may be varied to produce different flow channel structures, including the injection volume and velocity of the acid treatment fluid, and the characteristics of the acid used. Properties of the formation, such as porosity and permeability, may also affect the flow channels produced by a given acid treatment.

DESCRIPTION OF DRAWINGS

Like reference symbols in the various drawings indicate like elements.

DETAILED DESCRIPTION

Figure 1A:
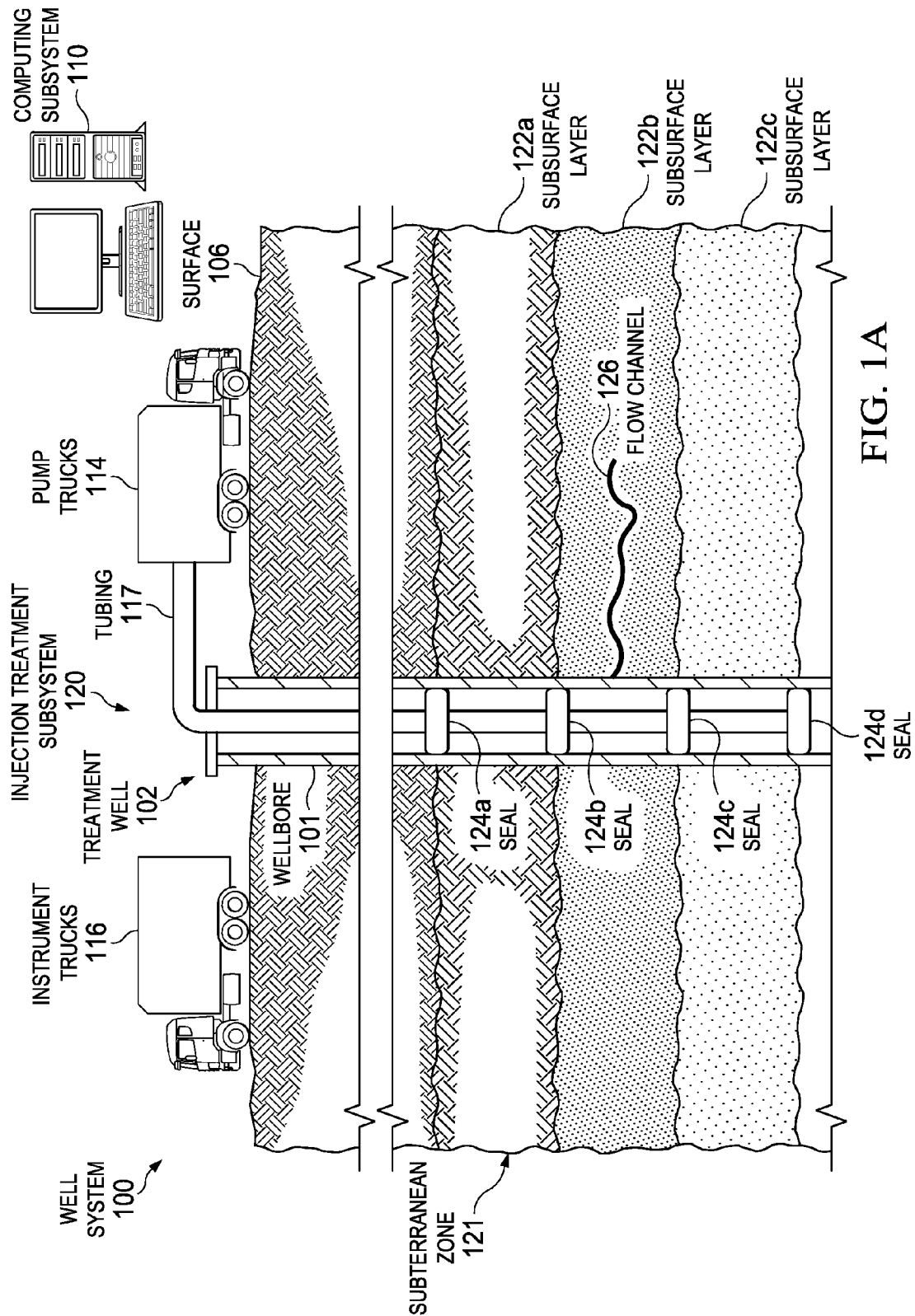
FIG. 1A is a diagram of an example well system.

The present disclosure describes concepts related to determining acid treatment parameters for use in treating a rock structure. Acid treatments are designed to create highly conductive flow passages in a rock structure which can penetrate beyond the damaged zone, grow deep in the formation, and result in a negative skin. A well operator selects various parameters for the acid treatment based on the particular rock structure to achieve a specified fluid conductivity. These parameters include, but are not limited to, the type of acid, the injection flow rate of the acid, the volume of acid fluid, and/or other parameters. Different combinations of parameters lead to different types of flow structures being formed in the rock. For example, choosing an acid injection rate that is too low of a may lead to only the face of the rock being penetrated, leading to a negligible increase in conductivity. Choosing an acid injection rate that is too high may also be problematic, as more of the rock structure may be penetrated than is necessary, leading to a waste of acid volume and higher costs. In certain instances, the parameters can be selected to produce a wormhole flow structure, making efficient use of the acid volume to achieve the specified fluid conductivity.

The concepts herein encompass determining parameters of an acid injection treatment that will produce a specified fluid conductivity and in certain instances a wormhole flow structure. In one example implementation, one or more characteristics of a particular rock structure are identified. One or more parameters of an acid injection treatment are then determined using a pre-determined acidization formula configured to compute values of the one or more parameters that will produce a specified fluid conductivity and/or flow structure, and in certain instances, a wormhole flow structure in the particular rock structure when the acid injection treatment is applied. The pre-determined acidization formula is configured to compute the values of the one or more parameters based on the one or more identified characteristics of the particular rock structure and/or the characteristics of the acid. In some instances, the one or more parameters of the acid injection treatment may include an injection flow velocity, a characteristic of an acid to be used in the acid injection treatment such as a reaction rate, and/or another acid injection treatment parameter.

In one example implementation, acid injection velocity as a function of both acid properties and rock properties is given as a formula. Such a formula may be used to determine acid injection velocities for both mass-transfer controlled reactions and kinetically controlled reactions. The interfacial area fraction is determined from experimental data, numerical simulations, and/or other techniques. The injection velocity is converted to lab core flow injection rate and field well injection rate by scale up equations.

Choosing lab core flow tests based on a predicted injection rate can reduce the number of iterations of the test required, thereby reducing the cost of repeating numerous lab core flow tests. Also, by choosing an injection rate based on the concepts described herein, the total volume of acid used in the injection treatment may be reduced, leading to further cost savings.

FIG. 1A shows a schematic diagram of an example well system 100. The example well system 100 includes a well 102. The well system 100 can include one or more additional treatment wells, observation wells, or other types of wells. The computing subsystem 110 can include one or more computing devices or systems located at the well 102, or in other locations. A computing subsystem 110 or any of its components can be located apart from the other components shown in FIG. 1A. For example, the computing subsystem 110 can be located at a data processing center, a computing facility, or another location. The well system 100 can include additional or different features, and the features of the well system can be arranged as shown in FIG. 1A or in any other configuration.

The example well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122a-c. The subsurface layers 122a-c can be defined by geological or other properties of the subterranean zone 121. For example, each of the subsurface layers 122a-c can correspond to a particular lithology, a particular fluid content, a particular stress or pressure profile, and/or another characteristic. In some instances, one or more of the subsurface layers 122a-c can be a fluid reservoir that contains hydrocarbons or other types of fluids. The subterranean zone 121 may include any rock formation. For example, one or more of the subsurface layers 122a-c can include sandstone, carbonate materials, shale, coal, mudstone, granite, or other materials.

The example well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be an acid treatment configured to produce flow structures (e.g., 126) within the subterranean zone 121.

As shown, a tubing 117 may be inserted into the well bore 101. The tubing 117 includes one or more seals 124a-d. In some implementations, the seals 124a-d may include any structure operable to prevent passage of fluid into portions of the wellbore below the structure, including, but not limited to, mechanical set packers, tension set packers, rotation set packers, hydraulic set packers, inflatable rubber or balloon packers, swell packers, permanent packers, cement packers, and/or any other type of seal.

The seal 124a-b may be operable to divide the wellbore 101 into different zones while the acid treatment is being performed. For example, seal 124b may be activated to prevent the injected fluid from passing into portions of the wellbore 101 below the seal 124b (e.g., subsurface layers 122b and 122c). The seal 124a may also be closed to trap the injected fluid between the seal 124a and the seal 124b. By holding the fluid at pressure between these two seals 124a and 124b, the acid treatment may be performed on subsurface layer 122a.

Figure 3:
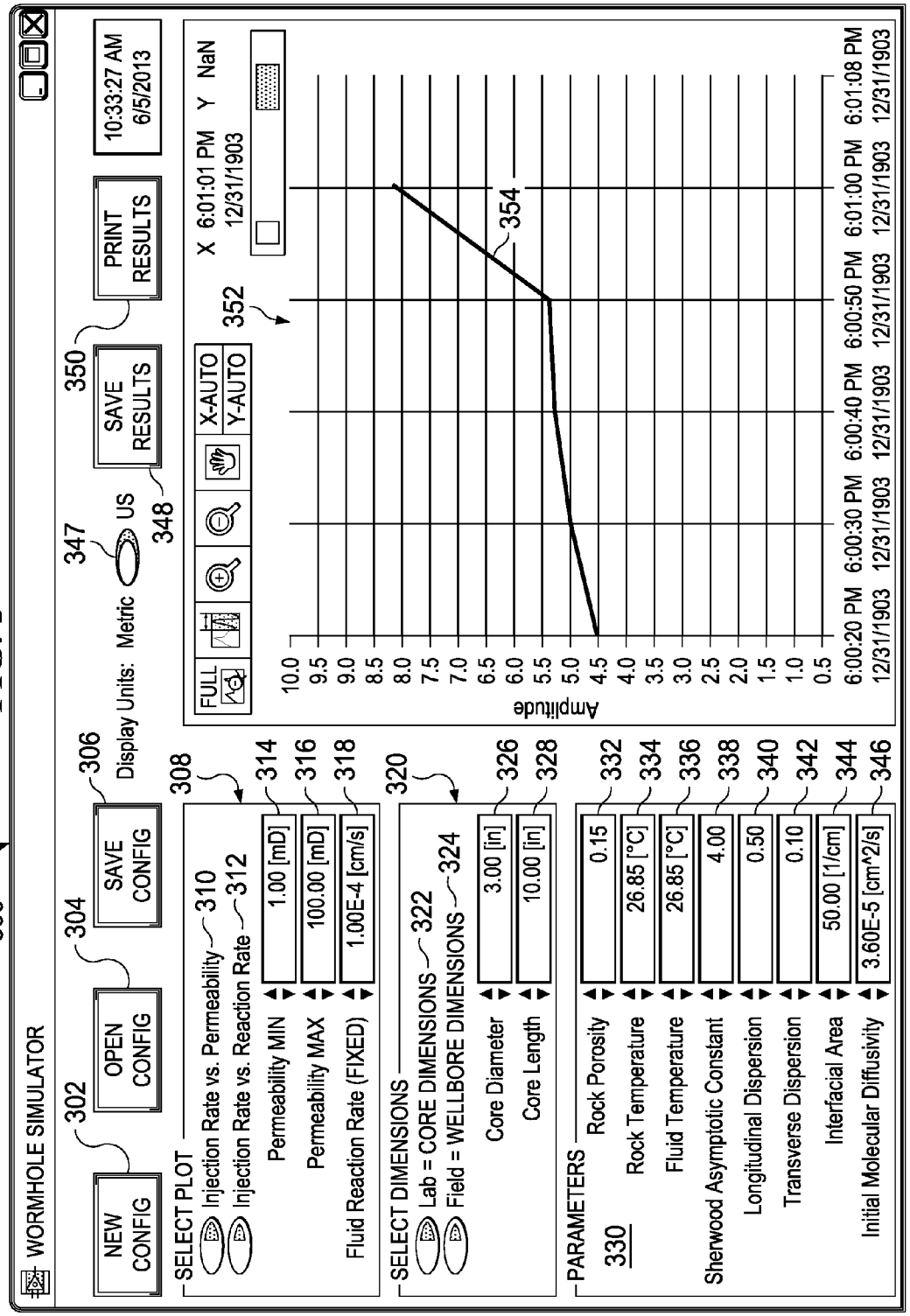
FIG. 3 is a screen shot showing an example interface for presenting results of the acid injection parameter determination process.

The acid treatment can generate flow structures in the subterranean zone 121, such as flow structure 126. Although flow structures 126 is shown as a single wormhole structure extending from the wall of the well bore 101, the acid treatment can generate different configurations of flow structures, including, but not limited to, uniform, ramified, conical, face, or any other configuration. Examples of these configurations are shown in FIG. 3.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
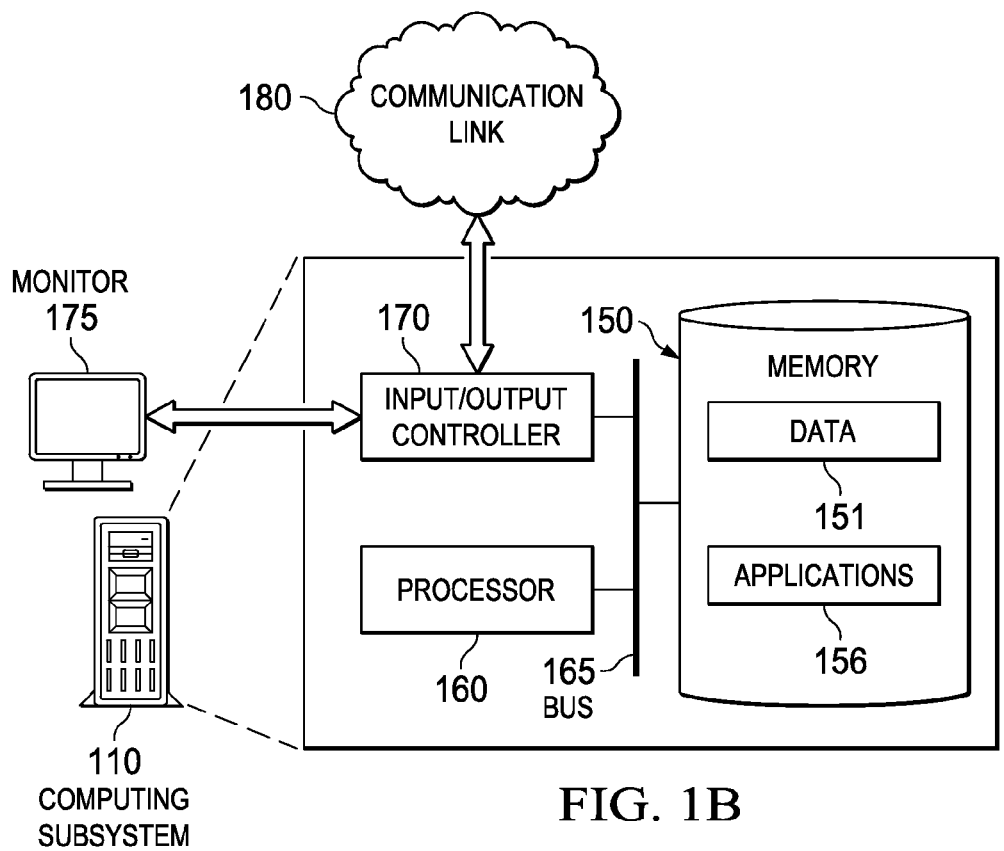
FIG. 1B is a diagram of the example computing subsystem 110 of FIG. 1A.

FIG. 1B is a diagram of an example computing subsystem 110 operable to determine parameters of an acid injection treatment that will produce a treated specified flow conductivity and/or specific flow structure. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network. In some implementations, requests may be received from a remote site to determine acid injection treatment parameters based on characteristics of a particular rock structure. For example, a message may be received over the communication link 180 including characteristics of a rock structure such as porosity, permeability, temperature, and/or other characteristics. The computer subsystem 110 may determine the acid injection parameters according to the concepts described herein, and respond with a message to the remote site including the determined acid injection parameters.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes data 151 and applications 156.

The applications 156 can include software applications, scripts, programs, functions, executables, or other modules that are interpreted or executed by the processor 160. Such applications may include machine-readable instructions for performing one or more of the operations represented in FIG. 5. The applications 156 may include machine-readable instructions for determining the acid injection parameters as described herein. The applications 156 can obtain input data from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180). In some implementations, the applications 156 may include a graphical user interface (GUI) operable to display results of determining the acid injection parameters. For example, the applications 156 may display on an output device, such as the monitor 175, a graphical representation showing various acid injection parameter options, such as the graph shown in FIG. 3. In some cases, the applications 156 may display these results in the form of a web page.

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4. The input data received by the processor 160 or the output data generated by the processor 160 can include any of the data 151.

Figure 2:
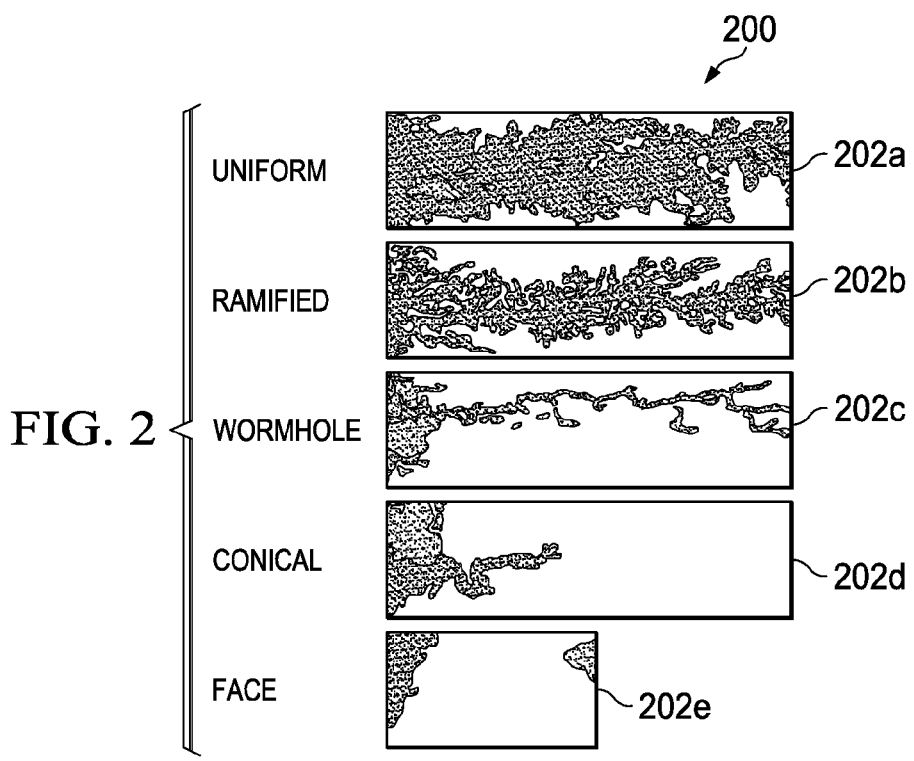
FIG. 2 is a diagram showing different types of wormhole structures formed in a rock structure.

FIG. 2 is a representation 200 of examples of different treatment profiles 202a-e. Treatment profile 202a shows an example of the uniform treatment profile, in which large volumes of the rock structure have been eaten away by acid treatment. In some cases, the uniform treatment profile such as 202a may be undesirable because it indicates too much of the rock structure has been removed. Ramified treatment profile 302b shows a similar but less extreme treatment profile in which less of the rock structure has been removed by the treatment than the uniform treatment profile 302a. The treatment profiles 202a and 202b may not be desirable because they indicate that too much of the rock structure has been removed, thus indicating that a less intense treatment may have been sufficient.

The wormhole treatment profile 202c may be a desirable treatment profile to achieve. The wormhole treatment profile 202c shows a relatively unitary and continuous flow channel (i.e., a wormhole structure) extending through the formation. Such a structure may produce an increase in permeability for the formation, allowing greater conductivity and greater production. Further, the wormhole treatment profile 202c may be desirable because treatments involving removing greater volumes of the rock structure may not produce enough of an increase in formation conductivity to be cost-effective, as they may require the use of more treatment fluid (e.g., acid) or the use of more corrosive treatment fluids. The conical treatment profile 202d and the face treatment profile 202e may be indicative of insufficient rock volume being removed during a treatment, resulting in an unsatisfactory increase in formation conductivity.

FIG. 3 is a screenshot showing an example interface 300 for presenting results of the acid injection parameter determination process. The interface 300 includes a series of buttons 302, 304, 306, to create a new configuration, open an existing configuration, and save the current configuration, respectively. The user may activate these buttons by clicking on them with a pointing device such as a mouse.

The interface 300 includes a plot selection pane 308 that allows a user to define the type of results to be presented. The plot selection pane 308 includes an injection rate versus permeability button 310 and injection rate versus reaction rate button 312. A user may select between the two types of plots associated with the buttons by activating the buttons with a pointing device. The plot selection pane 308 also includes a permeability minimum box into which the user can enter a minimum permeability value to be displayed in the results. The plot selection pane 308 also includes a maximum permeability box 316 into which a user can enter the maximum permeability value to be displayed in the results. The plot selection pane 308 also includes a fluid reaction rate box into which the user can enter the reaction rate of the acid to be used in the simulated acid treatment. In some implementations, the fluid reaction rate box will be disabled when the user selects the injection rate versus reaction rate button 312, as the reaction rate will vary in the results.

The interface 300 includes a dimension selection pane 320 including buttons 322 and 324 that allows the user to toggle between core dimensions (for use in examining core samples in a lab), and wellbore dimensions (for use in the field). The dimension selection pane 320 also includes a core diameter box 326 and a core length box 328 allowing the user to input dimensions of a core sample being analyzed. In some implementations, the core diameter box 326 in the core length box 328 will be disabled when button 324 is enabled.

The interface 300 also includes a parameter pane 330 allowing the user to enter various constant parameters associated with the modeled injection treatment. Rock porosity box 332 allows the user to enter the porosity of the rock structure to be treated. In some implementations, the porosity value may be entered in p.u. (porosity units) and range from 0 to 1. Rock temperature box 334 allows the user to enter the temperature of the rock structure to be treated. Fluid temperature box 336 allows the user to enter the temperature of the fluid to be used in the proposed acid treatment. Sherwood asymptotic constant box 338 allows the user to enter the value of the Sherwood asymptotic constant representing dimensionless mass transfer coefficient of the rock structure to be treated. Longitudinal dispersion box 340 allows the user to enter the longitudinal dispersion of the rock structure to be treated. Transverse dispersion box 342 allows the user to enter the transverse dispersion of the rock structure to be treated. The interfacial area of the rock structure to be treated can be entered into the interfacial area box 344. The initial molecular diffusivity of the rock structure may be entered into initial molecular diffusivity box 346.

The results pane 352 included in the interface 300 displays results showing parameters of the acid injection treatment for the particular rock structure described by the entered rock structure parameters. The results shown in the results pane 352 may be generated according to the concepts and formulas described herein. In some implementations, the results pane 352 may display the results as a line graph plotting either injection rate versus permeability, or injection rate versus reaction rate based on the user's selection in the selection pane 308. Example plot 354 shows such a graph. In some cases, the results pane 352 may display the results in a graphical format, including, but not limited to, a bar graph, a pie graph, multiple line graph plots, a scatter graph, and/or other graphical formats. The results pane 352 may also be presented as part of a webpage accessible via a web browser.

The interface 300 also includes a unit selector 347 operable to change the results pane 352 between displaying results in metric units and US units. The save results button 348 allows the results displayed in the results pane 352 to be saved for later retrieval. In some implementations, the save results button 348 saves the results to a file format, including, but not limited to, Portable Document Format (PDF), Joint Photographic Expert Group format (JPEG), MICROSOFT EXCEL format, Tagged Image File Format (TIFF), and/or other file formats. The print results button 350 may send the contents of the results pane to an attached or networked printer for printing.

In operation, the interface 300 allows an operator to enter values into the input boxes (e.g., 314-318, 326-328, 332-346) and read the acid treatment parameters from the graph 354 in results pane 352. The operator may then perform the acid treatment according to the determined parameters plotted in the graph 354. For example, the operator may select an acid treatment with an injection rate and acid reaction rate plotted on the graph in the results pane 352, and may inject an acid with the specified acid reaction rate into the rock structure at the specified injection rate.

The graph 354 may allow the operator select an optimum solution for his particular situation or some other solution. If the operator knows the acid reaction rate (e.g., because a particular acid is available for use in the treatment), the operator may generate an injection velocity versus permeability graph to determine the necessary injection rate. If the operator knows permeability, the operator may generate an injection velocity versus reaction rate graph to determine the necessary injection velocity and/or reaction rate. Equipment availability, cost and/or engineering difficulty of obtaining a particular injection velocity and/or other factors may limit the available injection velocity, and may drive selection of a particular acid in view of the injection rate. Likewise, acid availability, cost, difficulty of working with specific acids may affect which acid the operator uses and may drive the injection rate in view of the acid.

Having the graph lets the operator select an optimum solution for his particular situation or some other solution (something he likes for some reason or another). If he knows acid rxn rate (e.g., he has a particular acid in mind), he uses the inj v. perm graph to determine the needed inj rate. If he knows perm, he uses the inj v. rxn rate graph to determine the inj and/or rxn rate needed. Equipment availability, cost and/or engineering difficulty of obtaining a particular inj rate and/or other factors may limit the available injection rate, and may drive selection of particular acid in view of the injection rate. Likewise, acid availability, cost, difficulty of working with specific acids might affect which acid he uses and may drive the injection rate in view of the acid.

Figure 4:
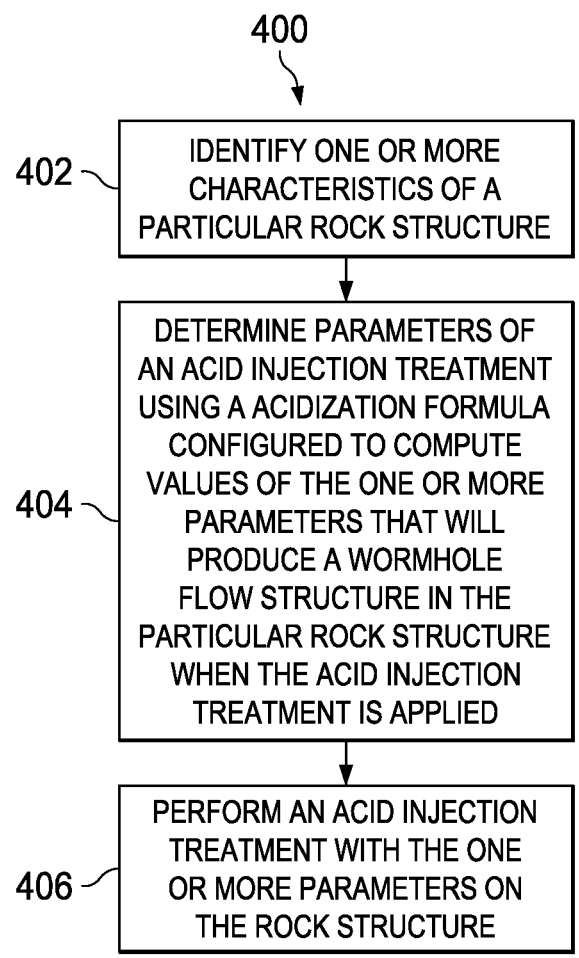
FIG. 4 is a flow chart illustrating an example method for determining acid injection treatment parameters for a particular rock structure.

FIG. 4 is a flow chart illustrating an example method for determining acid injection treatment parameters for a particular rock structure. At 402, one or more characteristics of a particular rock structure are identified. In some implementations, the characteristics include a porosity, a permeability, a temperature, a Sherwood asymptotic constant, a longitudinal dispersion, an interfacial area, an initial molecular diffusivity and/or other characteristics. In some implementations, the characteristics may be pre-identified for particular rock types, so that only the type of rock need be identified. For example, porosity, permeability, and other measurements may be taken for multiple samples of a given rock structure until a set of measurements that is deemed to be representative of the rock is obtained. In some cases, the measurements may be deemed representative after a statistically significant number of samples have been examined.

At 404, parameters of an acid injection treatment are determined using a specified acidization formula configured to compute values of the one or more parameters that will produce a specified flow structure, and in certain instances a wormhole flow structure, in the particular rock structure when the acid injection treatment is applied. In some cases, the characteristic of the acid to be used in the acid injection treatment is a reaction rate. The acidization formula may be of the form $$u_o = \frac{1}{\Lambda}\sqrt{\varepsilon_o D_{eT} k_{eff}},$$

where $u_o$ is the injection flow velocity, $\Lambda$ is a parameter indicating an acid channel shape at core-flow conditions, $\varepsilon_o$ is an initial porosity of the particular rock structure, $D_{eT}$ is an effective transverse dispersion coefficient, and $k_{eff}$ is an effective dissolution rate constant. At 406, an acid injection treatment with the one or more parameters is performed on the rock structure The method 400 may also include converting the injection velocity to an injection rate. In some cases, converting the injection velocity to an injection rate is performed according to the following equation:

$$q_c = 60\pi(2.54 r_c)^2 u_{opt},$$

where $u_{opt}$ is the injection velocity (cm/min), $q_c$ is the injection rate (cm³/min), $r_c$ is a core radius (in).

Determining the one or more parameters of an acid injection treatment may include presenting one or more options associated with the acid injection treatment, wherein each option includes one or more parameters associated with the acid injection treatment that will achieve the specified flow structure in the particular rock structure. For example, the options may be presented through the interface 300 described relative to FIG. 3.

In some implementations, determining the one or more parameters of the acid injection treatment that will produce the specified flow structure includes determining one or more parameters of the acid injection treatment that will produce a monotonic, non-ramified structure within the particular rock structure. For example, the one or more parameters of the acid injection treatment may be selected to produce a wormhole treatment profile similar or identical to treatment profile 202c from FIG. 2.

In one example process for determining acid injection parameters, based on the ratio of transverse to axial length scales of the porous medium dissolved by the acid, the qualitative criteria of acid dissolution shapes is represented in terms of parameter $\Lambda$:

$$\Lambda = \frac{\sqrt{D_{eT} k_{eff}}}{u_{tip}},$$

where $D_{eT}$ is the effective transverse dispersion coefficient, $u_{tip}$ is the velocity of the acid fluid at the tip of the wormhole, and $k_{eff}$ is an effective dissolution rate constant defined as $$k_{eff} = \frac{1}{\left(\frac{1}{k_s a_v} + \frac{1}{k_c a_v}\right)} = \frac{k_c k_s}{k_c + k_s} a_v,$$

where $k_c$ is the pore-scale mass transfer dissolution coefficient, $k_s$ is the surface reaction dissolution rate constant, $a_v$ is the areal fraction (interfacial surface area per unit of volume).

The parameter $\Lambda$ is used to account for the different acid channel shapes at core-flow conditions:

$$\Lambda \begin{cases} \ll O(1), & \text{Uniform dissolution,} \\ \in [0, 1, 1], & \text{Wormhole range,} \\ \gg O(1), & \text{Face dissolution} \end{cases}$$

Thus, in instances where a wormhole is the specified flow structure, the optimal injection velocity for wormhole conditions ($\Lambda \sim 1$) is derived as $$u_o = \frac{1}{\Lambda}\sqrt{\varepsilon_o D_{eT} k_{eff}},$$

where $\varepsilon_o$ is the initial porosity, $$D_{eT} = \alpha_o D_m + \lambda_T \frac{2 u_o r_p}{\varepsilon_o},$$

$r_p$ is the pore radius, $D_m$ is molecular diffusion coefficient, $\alpha_o$ and $\lambda_T$ are numerical coefficients that depend on the pore structure.

The mass transfer dissolution coefficient can be expressed as $$k_c \simeq \frac{D_m}{2 r_p} Sh_\infty,$$

where $Sh_\infty$ is the asymptotic Sherwood number. Due to that the effect of convective mass transfer on acid dissolution is weak and can be negligible, the asymptotic Sherwood number is found to vary from about 48/11 to about 3.66 for the cases of a very slow reaction to a very fast reaction.

Substituting these expressions above, the injection rate is derived as $$u_{opt} = \frac{1}{\Lambda}\sqrt{AB\left(\alpha_o D_m + \lambda_{eT} k_{eff} \frac{2u_{opt} r_p}{\varepsilon_o}\right)}$$

and the non-linear equation of $u_{opt}$ can be solved for $$u_{opt} = \frac{1}{2\Lambda^2}\left[ABD + \sqrt{(ABD)^2 + 4\Lambda^2 ABC}\right],$$

where $$A = \frac{2\varepsilon_o}{r_p},$$

$$B = \left(\frac{1}{k_s} + \frac{2r_p}{SH_\infty}D_m\right)^{-1},$$

$$C = \alpha_o D_m,$$

$$D = \lambda_T \frac{2r_p}{\varepsilon_o} = 4\frac{\lambda_T}{A}.$$

The average pore diameter (in microns) can be calculated from rock properties based on a capillary permeability model $$d_p = \left(\frac{K}{a\varepsilon}\right)^{\frac{1}{b}},$$

where K is the rock permeability in mD, $\varepsilon$ is the rock porosity (volume fraction), a and b are values that can be numerically obtained from data points for a specific rock type by using a numerical method such as Gauss-Newton method. For example, for carbonate rock samples, it was determined that a=20.417 and b=1.615 from a set of core data. Thus the average pore radius for carbonates in centimeters can be written as:

$$r_p = 0.077\left(\frac{K}{\varepsilon}\right)^{\frac{1}{1.615}} \times 10^{-4}.$$

For mass transfer controlled reactions such as HCl-limestone reactions where $k_c \ll k_s$, the effective reaction rate becomes:

$$k_{eff} \simeq a_v k_c, D_{eT} \simeq \alpha_o D_m, r_p \simeq \frac{2}{a_v},$$

then the injection rate can be reduced to $$u_{opt} = \frac{a_v D_m}{2}\sqrt{\varepsilon_o \alpha_o Sh_\infty}.$$

For kinetically controlled reactions such as HCl-dolomite, EDTA-limestone, DTPA-limestone, etc. where $k_s \ll k_c$, the effective reaction rate becomes $$k_{eff} \simeq a_v k_s,$$

$$D_{eT} \simeq \alpha_o D_m,$$

then the optimum injection rate can be reduced to $$u_{opt} = \sqrt{\varepsilon_o \alpha_o D_m a_v k_s}.$$

As the Sherwood number $Sh_\infty$ and value of $\alpha_o$ are often set as constants, in order to use the simplified injection rates, the initial porosity $\varepsilon_o$, the interfacial areal fraction $a_v$, the acid reaction rate with the rock surface $k_s$, and the molecular diffusivity $D_m$ have to be given. From acid core flow experiments for a specific type of rock, $\varepsilon_o$, $k_s$ and $D_m$ can be measured. The interfacial areal fraction $a_v$ is the only measurement that is not available directly from the experiments. However, it can be calculated backward from the previous equation once $u_{opt}$, $\varepsilon_o$, $k_s$ and $D_m$ are measured.

Note that from the previous equation, the area fraction $a_v$ can be determined from either experimental injection rate data by $$a_v = \frac{u_{opt}^2}{\varepsilon_o \alpha_o D_m k_s}.$$

Since many experiments or simulations are conducted on similar carbonate cores, the interfacial areal fraction can be assumed to be constant. Once it is calculated from a set of data, the value can be used to predict the optimum injection rates for other acid fluids on the same type of carbonate rocks. Alternatively, the numerical wormhole model and simulations can also be used to calibrate the value of interfacial areal fraction $a_v$. Once the wormhole model is validated toward the specific acid and type of rock, the value of $a_v$ can be adjusted for the numerical results to match one of the four parameters: $u_{opt}$, $\varepsilon_o$, $k_s$ and $D_m$. Once $a_v$ is determined, the previous equations can be used to predict optimum acid injection rates for larger range of treatment conditions that may not be available from experiments. These predicted results can provide expanded capabilities and guidance for acid treatment design.

The acid injection velocity (in [cm/s]) can be converted to lab core flow rate $q_c$ (in [cm³/min]) by $$q_c = 60\pi(2.54r_c)^2 u_{opt},$$

where $r_c$ is the core radius in inches.

The lab core flow rate (in [cm³/min]) can be converted to field well flow rate $q_w$ (in [bbl/min]) by $$q_w = 7.54775 \times 10^{-5} q_c \frac{r_w h_f}{r_c l_c},$$

where $r_w$ is the well radius in inches, $h_f$ is the formation thickness in feet, and $l_c$ is the core length in inches.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects, some or all of the features described here can be combined or implemented separately in one or more software programs for determining acid injection treatment parameters. The software can be implemented as a computer program product, an installed application, a client-server application, an Internet application, or any other suitable type of software While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:
1. A method comprising:
receiving a plurality of rock structure characteristics, the rock structure comprising a rock formation that includes a wellbore formed therethrough;
receiving a plurality of core sample characteristics, the core sample associated with the rock structure;
determining, by one or more processors of a computing system, based on the rock structure characteristics, an injection flow velocity of an acid injection treatment to produce a specified flow structure in the formation when the acid injection treatment is applied;
determining, by the one or more processors, based on the injection flow velocity, the rock structure characteris- tics, and the core sample characteristics, a lab core flow rate of the acid injection treatment; and determining, by the one or more processors, based on the lab core flow rate and the rock structure characteristics, a field well flow rate of the acid injection treatment.

2. The method of claim 1, wherein determining the injection flow velocity is further based on one or more characteristics of the acid to be used in the acid injection treatment, the one or more characteristics comprising a reaction rate.

3. The method of claim 1, wherein determining the injection flow velocity comprises applying an acidization formula of the form $$u_o = \frac{1}{\Lambda}\sqrt{\varepsilon_o D_{eT} k_{eff}},$$

where $u_o$ is the injection flow velocity, $\Lambda$ is a parameter indicating an acid channel shape at core-flow conditions, $\varepsilon_o$ is an initial porosity of the rock structure, $D_{eT}$ is an effective transverse dispersion coefficient, and kern is an effective dissolution rate constant.

4. The method of claim 1, further comprising converting the injection flow velocity to an injection rate.

5. The method of claim 1, further comprising determining one or more parameters of the acid injection treatment by presenting one or more options associated with the acid injection treatment, each option including one or more parameters associated with the acid injection treatment and being configured to achieve the specified flow structure in the rock structure.

6. The method of claim 1, further comprising determining one or more parameters of the acid injection treatment that will produce a monotonic, non-ramified structure within the rock structure.

7. The method of claim 1, wherein the core sample characteristics comprise at least one of: a porosity, a permeability, or a temperature.

8. The method of claim 1, wherein the specified flow structure is a wormhole structure.

9. The method of claim 1, further comprising performing an acid injection treatment on the rock structure based on the determined field well flow rate.

10. The method of claim 1, further comprising outputting a relationship between injection flow velocity and reaction rate, or between injection flow velocity and porosity.

11. A system comprising:
memory for storing data; and
one or more processors operable to perform operations comprising:
  receiving a plurality of rock structure characteristics, the rock structure comprising a rock formation that includes a wellbore formed therethrough;
  receiving a plurality of core sample characteristics, the core sample associated with the rock structure;
  determining, based on the rock structure characteristics, an injection flow velocity of an acid injection treatment to produce a specified flow structure in the formation when the acid injection treatment is applied;
  determining, based on the injection flow velocity, the rock structure characteristics, and the core sample characteristics, a lab core flow rate of the acid injection treatment and determining, based on the lab core flow rate and the rock structure characteristics, a field well flow rate of the acid injection treatment.

12. The system of claim 11, wherein determining the injection flow velocity is further based on one or more characteristics of the acid to be used in the acid injection treatment, the one or more characteristics comprising a reaction rate.

13. The system of claim 11, wherein determining the injection flow velocity comprises applying an acidization formula of the form $$u_o = \frac{1}{\Lambda}\sqrt{\varepsilon_o D_{eT} k_{eff}},$$

where $u_o$ is the injection flow velocity, $\Lambda$ is a parameter indicating an acid channel shape at core-flow conditions, $\varepsilon_o$ is an initial porosity of the rock structure, $D_{eT}$ is an effective transverse dispersion coefficient, and $k_{eff}$ is an effective dissolution rate constant.

14. The system of claim 11, wherein the operations further comprise converting the injection flow velocity to an injection rate.

15. The system of claim 11, wherein the operations further comprise determining one or more parameters of the acid injection treatment by presenting one or more options associated with the acid injection treatment, each option including one or more parameters associated with the acid injection treatment and being configured to achieve the specified flow structure in the rock structure.

16. The system of claim 11, wherein the operations further comprise determining one or more parameters of the acid injection treatment that will produce a monotonic, non-ramified structure within the rock structure.

17. The system of claim 11, wherein the core sample characteristics comprise at least one of: a porosity, a permeability, or a temperature.

18. The system of claim 11, wherein the specified flow structure is a wormhole structure.

19. The system of claim 11, wherein the operations further comprising performing an acid injection treatment on the rock structure based on the determined field well flow rate.

20. A non-transitory, computer-readable medium storing instructions operable when executed to cause at least one processor to perform operations comprising:
  receiving a plurality of rock structure characteristics, the rock structure comprising a rock formation that includes a wellbore formed therethrough;
  receiving a plurality of core sample characteristics, the core sample associated with the rock structure;
  determining, based on the rock structure characteristics, an injection flow velocity of an acid injection treatment to produce a specified flow structure in the formation when the acid injection treatment is applied;
  determining, based on the injection flow velocity, the rock structure characteristics, and the core sample characteristics, a lab core flow rate of the acid injection treatment; and
  determining, based on the lab core flow rate and the rock structure characteristics, a field well flow rate of the acid injection treatment.

* * * * *